United States Patent [19]

Lawrence et al.

[11] 4,201,890
[45] May 6, 1980

[54] MULTIPORT DIGITAL SWITCHING ELEMENT

[75] Inventors: Alan J. Lawrence; Jeffrey N. Denenberg, both of Stamford; Murray Rubinstein, Trumbull; Daniel C. Upp, Easton, all of Conn.

[73] Assignee: International Telephone and Telegraph, New York, N.Y.

[21] Appl. No.: 888,582

[22] Filed: Mar. 17, 1978

[51] Int. Cl.² .......................... H04J 3/06; H04Q 11/04
[52] U.S. Cl. ...................................... 370/68; 370/86; 370/100
[58] Field of Search ........ 179/15 AT, 15 AQ, 15 BA, 179/15 AL, 18 ES, 18 EA, 15 BS

[56] References Cited

U.S. PATENT DOCUMENTS

| | | | |
|---|---|---|---|
| 3,781,818 | 12/1973 | Pardoe et al. | 179/15 BV X |
| 3,912,873 | 10/1975 | Skaperda | 179/18 FC |
| 3,997,896 | 12/1976 | Cassarino, Jr. et al. | 340/172.5 |
| 4,030,072 | 6/1977 | Bjornsson | 340/172.5 |
| 4,031,512 | 6/1977 | Faber | 179/15 AL X |
| 4,050,097 | 9/1977 | Miu et al. | 364/200 |
| 4,074,072 | 2/1978 | Christensen et al. | 179/15 AQ |

OTHER PUBLICATIONS

"Generic Digital Switching System", by N. J. Skaperda, International Switching Symposium 1976, Tokyo, Japan, Oct. 1976.

Primary Examiner—Thomas W. Brown
Attorney, Agent, or Firm—John T. O'Halloran; Jeffrey P. Morris

[57] ABSTRACT

A multiport single sided switching element is described for providing space and time switching between the input ports thereof and the output ports thereof in response to digital command signals for frames of digitally encoded data in a plurality of channels which is phase (bit) asynchronously coupled to any port of the switching element, the command signals being in for example the same channels as is the data. Every port of the single sided switching element is adaptable as either an inlet or an outlet and thus may be configured in a switching network as a one-sided, as a two-sided, or multisided switching element and includes a time division multiplexed bus for providing a space path between the ports of the switching element and further includes transmit and receive logic at each port responsive to command signals for coupling data from the input of any port to the TDM bus and additional logic at each port selectively responsive to command signals for bit synchronously extracting the data from the TDM bus in any channel thereby providing time slot interchange prior to coupling of data from the switching element to other switching elements. In a preferred embodiment, a sixteen port switching element is described.

18 Claims, 18 Drawing Figures

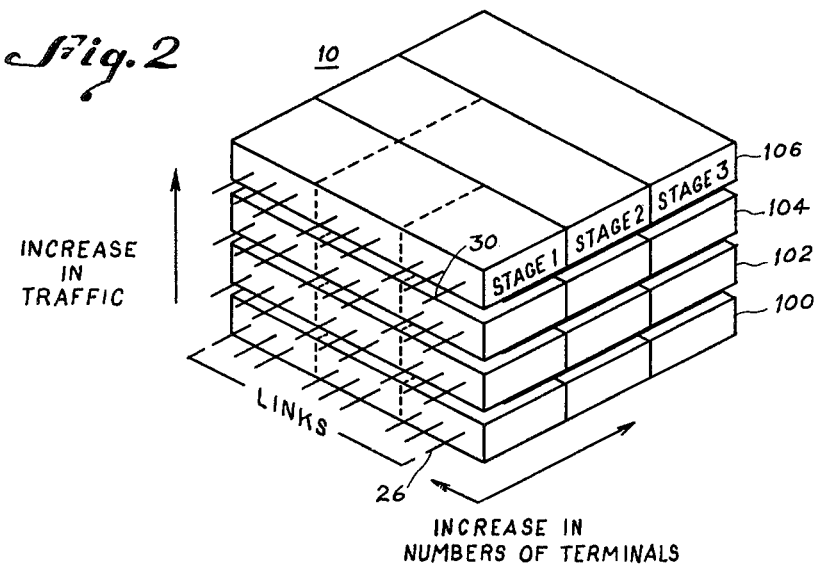
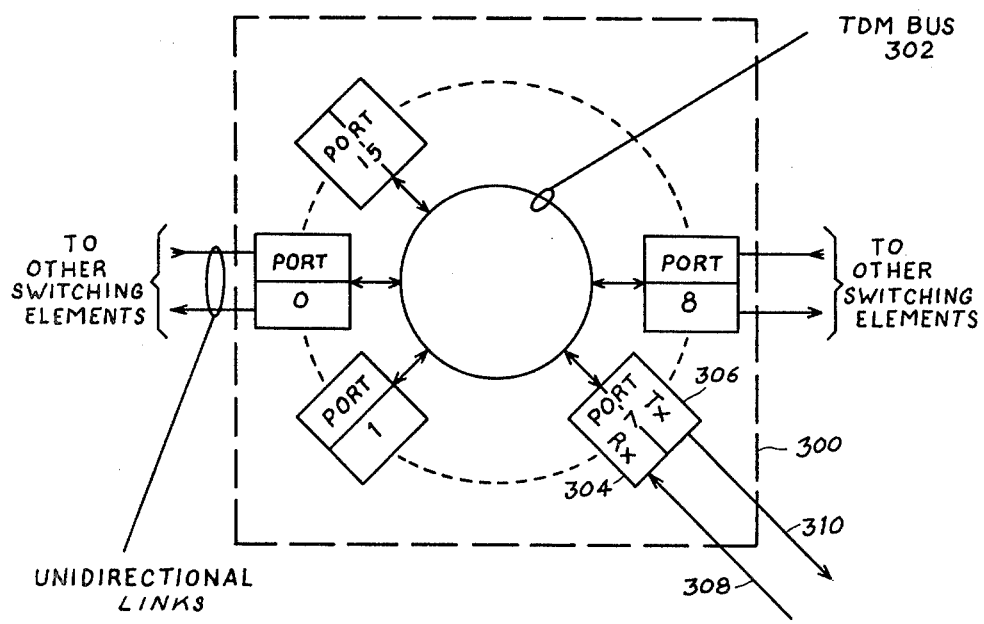

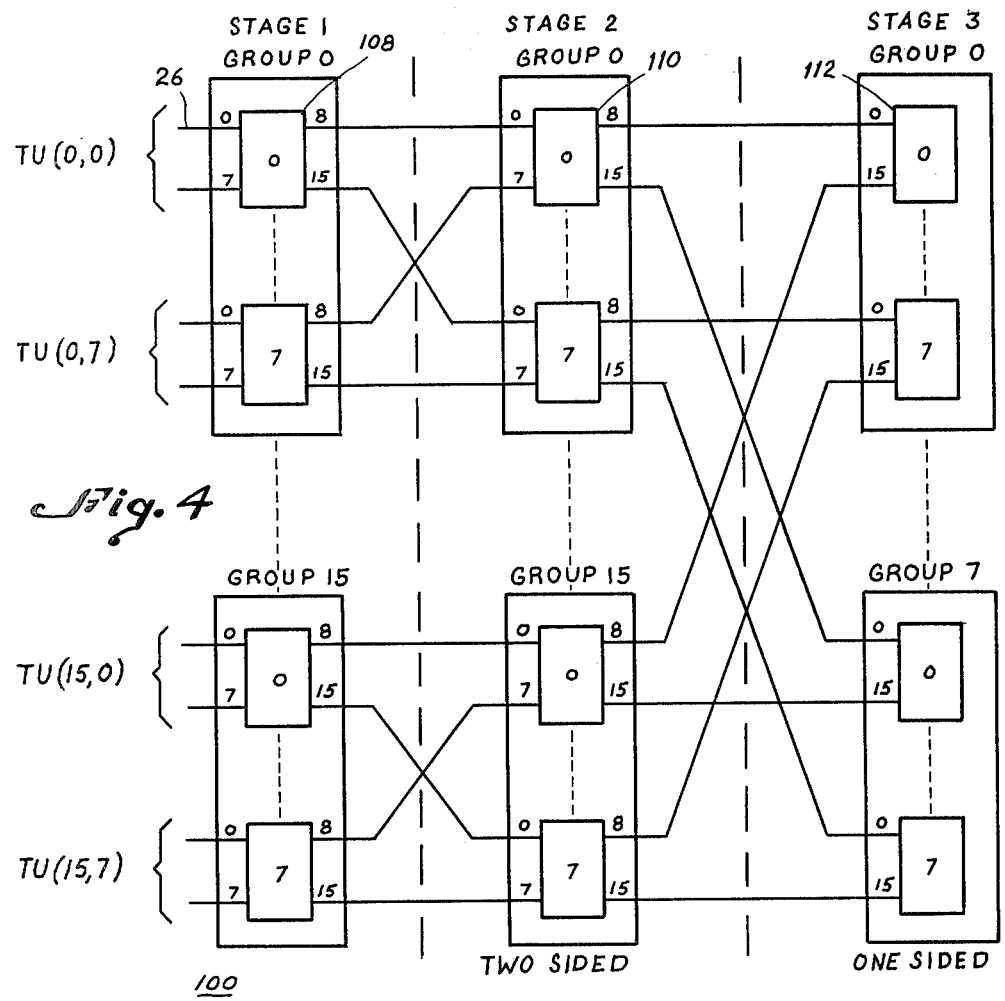
Fig. 4
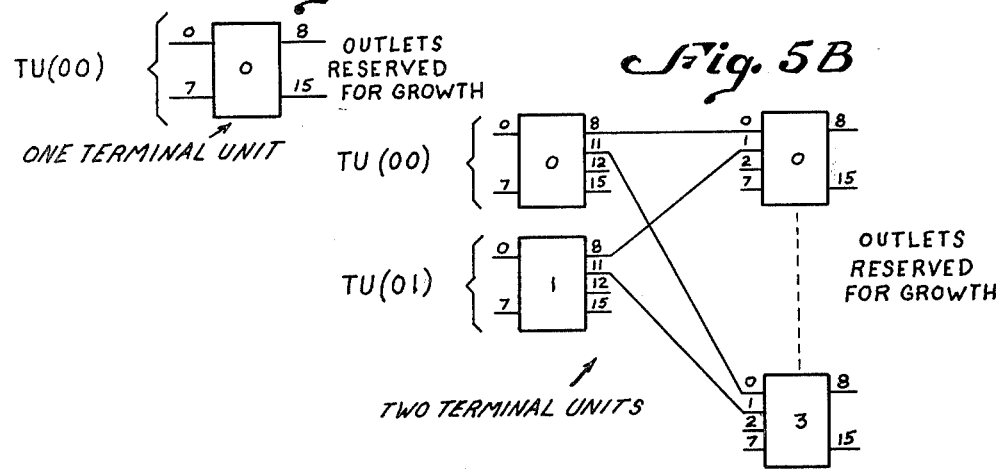
Fig. 5A
Fig. 5B

EIGHT TERMINAL UNITS

SIXTEEN TERMINAL UNITS

Fig. 10
CHANNEL WORD FORMATS
(ALL CHANNELS EXCEPT 0,16)
(a) SELECT 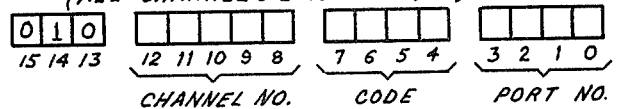
(b) INTERROGATE 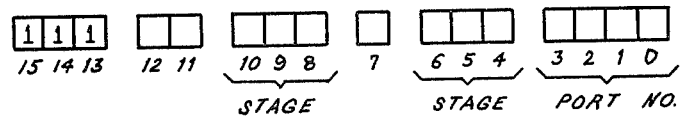
(c) ESCAPE 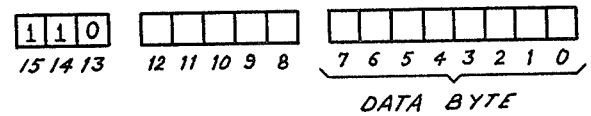
(d) SPATA 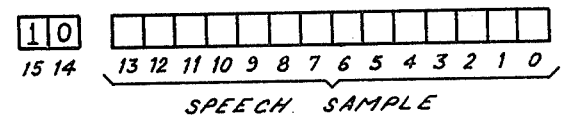
(e) IDLE/CLEAR 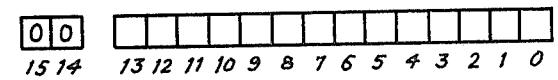
Fig. 11
CHANNEL WORD FORMATS
(CHANNEL 16)
(a) SELECT 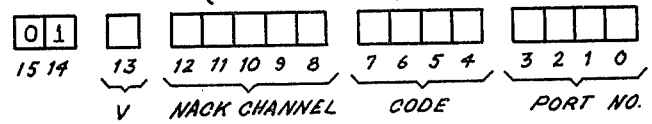
(b) ESCAPE 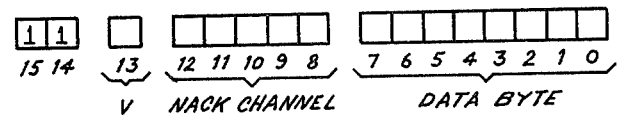
(c) HOLD 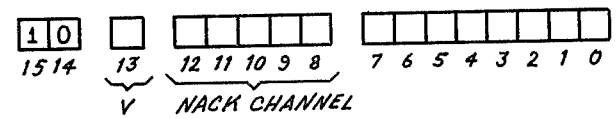
(d) IDLE/CLEAR 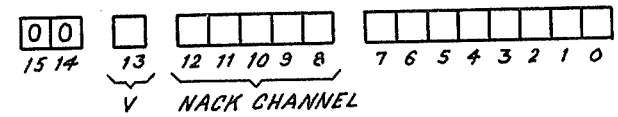

MULTIPORT DIGITAL SWITCHING ELEMENT

CROSS REFERENCE TO RELATED APPLICATIONS

Alan J. Lawrence, et. al. Ser. No. 888,251, filed Mar. 17, 1978, Distributed Control Digital Switching System.

Alan J. Lawrence, et. al. Ser. No. 888,607, filed Mar. 17, 1978, Expandable Digital Switching Network.

BACKGROUND OF THE INVENTION

1. Field of the Invention

The present invention relates generally to distributed control digital communication and computer systems, to digital switching networks and to telephone exchanges for providing expandable subscriber line/trunk traffic capacity for toll, tandem, rural, local, concentration and expansion applications. The present invention also relates to multiprocessor communications systems in which certain of the data processing functions associated with groups of telephone or other terminals are provided by one group of processors, while other processing functions associated with different and larger groups of the telephone or other terminals are provided independently by a second group of processors, while communication and data exchange between the two groups of processors is provided over common transmission paths thru a digital switching network. The present invention also relates to multi-port switching elements characterized in that the ports thereof function either as inlets or outlets depending only upon the network application requirements, for providing one-sided, two-sided or multi-sided switches in the network.

2. Description of the Prior Art

In modern telephone switching systems, it is presently required that data representative of the status of the subscriber lines and trunks served by such a switching system, together with required actions by the switch in response to various line and trunks status conditions be stored. Representative data is path set-up through the network, subscriber class of service, trunk class of call, directory number to equipment number translations, equipment number to directory number translations, etc. In prior art centralized control systems, this data is available in a common memory, which is duplicated for security and reliability purposes and is accessible by common control computers for serial operations upon the extracted data. Multiprocessing common control systems of the prior art require more than one processor to access the common memory to obtain data at the same time, resulting in interference problems and an effective loss of throughput, which increases as the number of processors increases.

Decentralization of control and distributed data processing has evolved in light of the problems inherent in a centrally controlled system. A prior art switching system wherein stored program controllers are distributed throughout the system is described by U.S. Pat. No. 3,974,343. Another prior art progressively controlled distributed control switching system is described by U.S. Pat. No. 3,860,761.

Prior art systems have concentrated upon obtaining a high efficiency for the processing function, with multiprocessing providing increased processing capability; however, with resultant undesirable interaction between software packages wherein the modification or addition of features could interfere with the current working of other features in an unpredictable manner. A major reason for the problems of prior art common control architectures, whether or not multiple processors are used, is that stored program control processing functions are shared in time between a plurality of tasks which randomly occur on demand of the originating and terminating traffic, which does not provide for an efficient operation of the stored software packages.

In accordance with the present invention, there is no separately identifiable control or centralized computer complex, since the control for the switching network is distributed in the form of multiple processors throughout the subsystems, with such distributed processors providing groups of necessary processing functions for the subsystems serviced. Thus, groups of control functions for certain subsystems are performed by processors dedicated to those subsystems; however, other processing functions of the same subsystems which may be more efficiently performed by other processors are performed by such other processors.

Also, in accordance with the present invention, a switching network architecture is provided wherein not only are multichannel digitized PCM speech samples or data between one terminal and another carried by the network, but the same channels also contain the path selection and control signals for the distributed control, which are carried on the same transmission paths thru the network. Every terminal, whether carrying data from a line or trunk or other data source is serviced by a terminal unit which contains all of the facilities and control logic to communicate with other terminals via other terminal units and to establish, maintain and terminate paths thru the switching network to other terminal units. All interprocessor communication is routed thru the switching network. A group switch containing switching elements providing both time and space switching is provided which is modularly expandable without disruption of service or rearrangement of existing interconnections to provide a growth from approximately 120 to 128,000 or more terminals, to accomodate increasing traffic load while performing as an effectively non-blocking network. A failed switching element is easily and automatically identified, isolated and bypassed by traffic.

In accordance with the present invention a group switch is provided in which multiport single sided switching elements are arrangeable in any inlet/outlet configuration for example, as 8X8 switches containing space and time switching in a ST configuration. The path selection throughout the network of switching elements is performed by control commands carried by speech channels. Further, reflection switching facilities are provided so that a path set up, for example, in a stage two switch, when no stage three is yet provided, will be reflected back via the speech path to form a folded network, while the outlets of the stage two switch remain available for future connection for network expansion. The expansion to a third stage would then require connection of the available outlets of stage two to the inlets of the future stage three switch.

SUMMARY OF THE INVENTION

A multiport single sided switching element is described for providing space and time switching between the input ports thereof and the output ports thereof in response to digital command signals for frames of digitally encoded data in a plurality of channels which are phase (bit) asynchronously coupled to any port of the switching element, the command signals being in the same channels as is the data. Every port of the single sided switching element is adaptable as either an inlet or an outlet and thus may be configured in a switching network as a one-sided, as a two-sided or as a multi-sided switching element and includes a time division multiplexed bus for providing a space path between the ports of the switching element and further includes transmit and receive logic at each port responsive to command signals for coupling data from the input of any port to the TDM bus and additional logic at each port selectively responsive to command signals for bit synchronously extracting the data from the TDM bus in any channel, thereby providing time slot interchange prior to coupling of data from the switching element to other switching elements. In a preferred embodiment, a sixteen port switching element is described.

BRIEF DESCRIPTION OF THE DRAWINGS

FIG. 2 illustrates the modular expandability of the switching network of the invention.

FIG. 3 is a simplified block diagram of a multiport switching element of the invention.

FIG. 4 illustrates one plane of a switching network of the invention.

FIGS. 5(a), 5(b), 5(c) and 5(d) illustrate the expansion of the switching network of the invention.

FIGS. 10(a), 10(b), 10(c), 10(d) and 10(e) illustrate channel word formats used in the invention.

FIGS. 11(a), 11(b), 11(c) and 11(d) illustrate additional channel word formats used in the invention.

FIGS. 13(a), 13(b), 13(c), 13(d), 13(e), 13(f), 13(g), and 13(h) are timing diagrams illustrative of the operation of the switching elements of the invention.

FIGS. 14(a), 14(b), 14(c), 14(d) and 14(e) are more detailed timing diagrams illustrative of the operation of the switching elements of the invention.

DESCRIPTION OF THE PREFERRED EMBODIMENT

Figure 1:
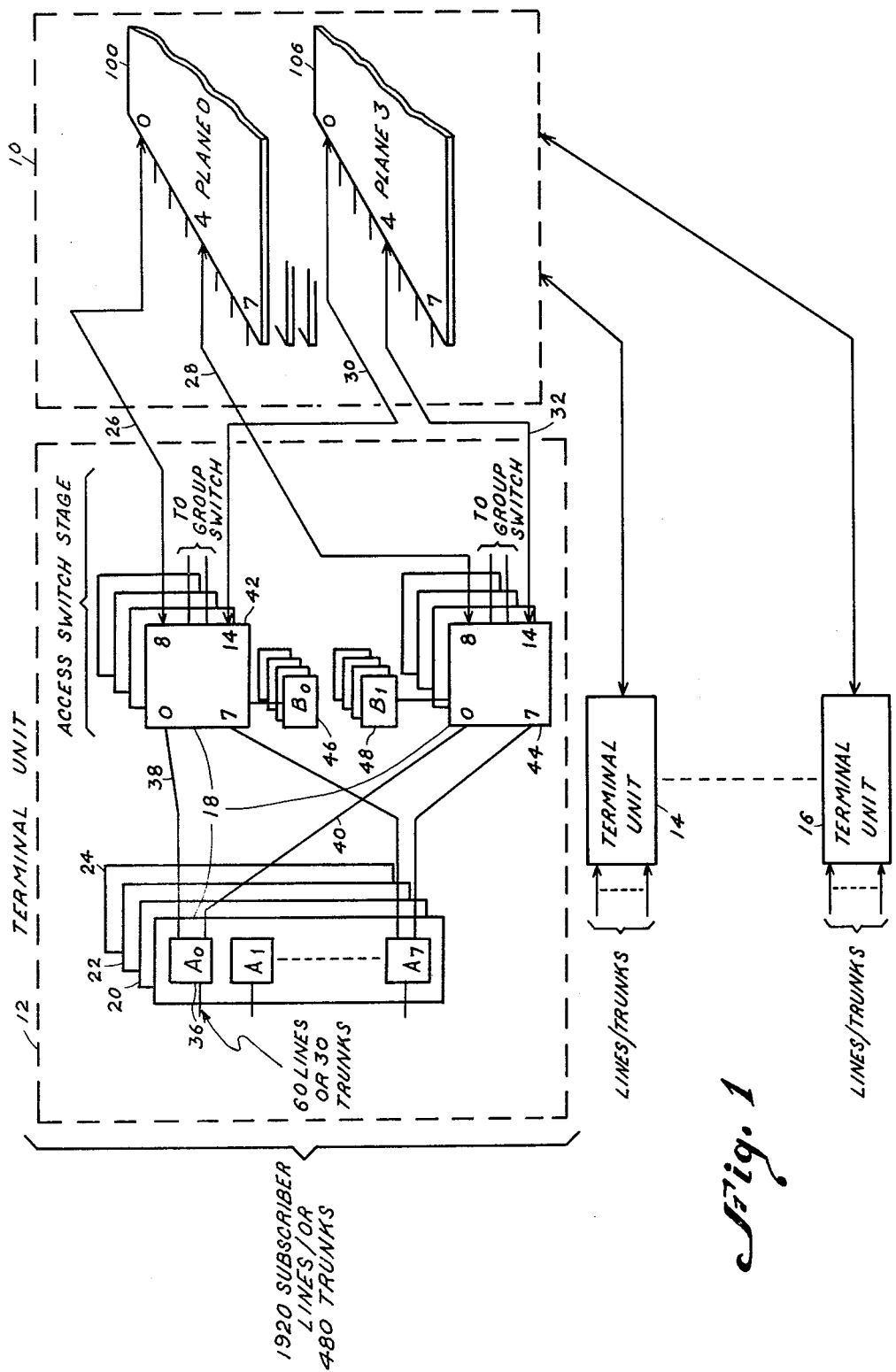
FIG. 1 is a block diagram of a distributed control system in accordance with the invention.

Referring to FIG. 1, a system block diagram of a distributed control digital switching system comprising a group switch 10 thru which a plurality of connections between terminal units are switched to provide transmission paths for coupling data between terminals serviced by the terminal units.

As used herein a terminal unit is a subsystem for servicing a group of terminals which terminate on one first stage switch in every plane of the group switch. Each terminal unit includes eight access switches through which data from the terminals is coupled to and from the group switch 10.

As used herein, a terminal subunit is a subsystem of a terminal unit for servicing a group of terminals which terminate on one security pair of access switches. Each terminal unit contains four security pairs of access switches. The PCM data at each terminal is derived, for example, from telephone line circuits of the type described in detail in the copending application, Ser. No. 903,458, a continuation of Ser. No. 773,713, filed Mar. 3, 1977, assigned to the same assignee as is the present invention.

Terminal units 12, 14 and 16 are representatively shown; however up to 128 terminal units or more may be switched by the group switch 10; hence terminal units 12, 14 and 16 are illustrative only. Each terminal unit has the capability of interfacing, for example, 1920 subscriber line terminals or 480 trunks to four terminal subunits, with terminal subunits 18, 20, 22 and 24 illustrated for terminal unit 12.

Thirty-two channel PCM multiplexed digital lines having multiplexed thereon thirty bidirectional subscriber lines are coupled to the terminal units.

Each terminal unit such as terminal unit 12 is coupled to group switch 10 by a plurality of multiplexed transmission links, each of which transmission links comprises two unidirectional transmission paths. Each terminal subunit 18, 20, 22 and 24 of terminal unit 12 is coupled to each plane of the group switch 10 by two such transmission links, thus for terminal subunit 18, transmission links 26 and 28 are illustrated as coupling terminal subunit 18 to plane 0 of group switch 10 and transmission links 30 and 32 couple terminal subunit 18 to plane 3 of group switch 10. Similarly, terminal subunit 18 is coupled to planes 1 and 2 of the group switch 10 by similar transmission links. Subunits 20, 22 and 24 are also coupled to every plane of the group switch in like manner as is terminal subunit 18.

Each transmission link 26, 28, 30 and 32 shown for terminal subunit 18 is bidirectional in that it includes a pair of unidirectional transmission paths, each path being dedicated to one direction of data flow. Each unidirectional transmission path carries thirty-two channels of digital information time division multiplexed (TDM) thereon in bit-serial format. Each frame of TDM format is comprised of the thirty-two channels with each channel having 16-bits of information, and at a bit transmission rate of 4.096 Mb/s. This transmission rate is clocked throughout the system, hence, the system may be characterized as rate synchronous.

Since, as will be explained hereinafter, the system is also phase asynchronous, such that there is no required phase relationship as to which data bits in a frame are received by different switching elements or by the different ports in a single switching element. This rate synchronous and phase asynchronous switching system is implemented in the group switch and in the access switches by a plurality of multi-port switching elements. When digital speech samples are transmitted anywhere within the system to or from a particular terminal, the digital speech samples must be time multiplexed into the correct channels on the tranmission links between switching elements used to connect the terminals. Time slot interchange is provided by each switching element, since the channels used to interconnect the terminals may vary.

Time slot interchange, i.e., the transposition of data on one channel to another channel is well known and described, for example, in U.S. patent application, Ser. No. 909,583, a continuation of Ser. No. 766,396, filed Feb. 7, 1977 and assigned to the same assignee as is the present invention. As will be described, a unique multi-port switching mechanism, which may comprise a 16- port switching element operative as a thirty-two channel time switch and a sixteen port space switch in typically less than a single frame time for all inputs thereto is provided. The digital speech samples may comprise up to 14-bits of the 16-bit channel word with the two remaining bits being used as protocol bits (to identify the data type in the other 14-bits of the channel word). Thus the 16-port switching element can be used to switch, for example, 14-bit linear PCM samples, 13-bit linear PCM samples; 8-bit companded PCM samples; 8-bit data bytes, etc.

Two groups of processors are included within each terminal subunit, such as terminal subunit 18, the first group of processors, shown as processors $A_0$, $A_1$, ... $A_7$, are each dedicated to a separate group of terminals, called a terminal cluster, and perform a specific group of processing functions, such as path set-up through the group switch 10 and the provision of an interface to the terminals within the terminal cluster. High traffic clusters, such as telephone trunk lines may include up to thirty terminals whereas low traffic clusters, such as telephone subscriber lines may contain up to sixty terminals. Each terminal subunit may interface with up to four high traffic clusters; hence contains four A-type processors, whereas a low traffic subunit may interface with eight low traffic clusters and hence contains eight A-type processors. Each A-processor may include for example, an Intel Corp. Model 8085 microprocessor interface and associated RAM and ROM memory. Thus, each terminal unit may contain, for example, up to 1920 low traffic terminals (for subscriber lines) for 480 high traffic trunk terminals. Each terminal cluster, such as terminal cluster 36 in subunit 18 includes one A-processor and its associated cluster terminal interface. This cluster terminal interface is coupled by a pair of bidirectional links 38 and 40 respectively to each of two access switches 42 and 44 within terminal subunit 18. The access switching elements, such as access switch elements 42 and 44 of subunit 18 are of the same switching element configuration as are the switching elements of the group switch 10. Access switching elements 42 and 44 each provide access for subunit 18 to one of a pair of a second group of processors, such as processors $B_0$ and $B_1$ in terminal subunit 18. Other pairs of B-type processors are included within terminal subunits 20, 22 and 24, but for purpose of description, only the B-processors of subunit 18 are illustrated. This second group of processors, the B-processors, are dedicated to a second group of processing functions, such as call control (the processing of call related data, such as signalling analysis, translations, etc.) for the terminals interfaced by terminal subunit 18 and may also be implemented by Intel Corp. microprocessor Model No. 8085 or its equivalents. A security pair of processors is constituted by the inclusion of identical processing functions in B-processors 46 and 48 and the access switches 42 and 44 for terminal subunit 18, therefore allowing each terminal cluster such as the $A_0$ cluster to select either half of the security pair, i.e., either B-processors 46 via access switch 42 or B-processor 48 via access switch 44 in the event of a failure of one half of the security pair, thereby providing an alternate path.

Referring now to FIG. 2, the group switching matrix 10 having four independent planes of switching capability, plane 0 at 100, plane 1 at 102, plane 2 at 104 and plane 3 at 106 is illustrated.

A plurality of planes are provided to meet the traffic and service integrity requirements of the particular system application. In preferred embodiments, two, three or four planes of switching may be provided, which will service 120,000 or more terminals, i.e., subscriber lines terminating in the aforementioned line circuits such as that of application Ser. No. 773,713.

Each plane of switching may contain up to three stages of switching elements in a preferred architecture. Access switching which selects a particular plane for a connection may be located within the individual terminal unit 12, rather than in the group switch 10. The particular plane of switching elements is selected for a connection by the access switching stage in the terminal unit. Thus, access switching element 42 in subunit 18 can select, for example, plane 0, 100 via link 26 and plane 3, 106 via link 30.

Group switch 10 is modularly expandable either by increasing the number of planes to increase data traffic handling performance, or by increasing the number of stages of switching elements or the number of switching elements per stage to increase the number of terminals served by the group switch. The number of stages per plane of the group switch 10 for typical application requirements is modularly expandable as follows:

| STAGE | LINKS PER PLANE | LOCAL APPLICATION LINES | LOCAL APPLICATION TERMINALS | TANDEM APPLICATION TRUNKS |
|---|---|---|---|---|
| 1 ONLY | 8 | 1,000 | 1,120 | 240 |
| 1 and 2 | 64 | 10,000 | 11,500 | 3,500 |
| 1, 2 and 3 | 1,024 | >100,000 | >120,000 | >60,000 |

Referring now to FIG. 3, a fundamental switching element of the present invention from which all switching stages are configured may comprise a multiport singlesided switch 300 which is illustratively described as a 16-port switching element. It is to be understood that the number of ports could be greater or less than sixteen, which is described as an example only. A singlesided switch may be defined as a switching element having a plurality of ports of bidirectional transmission capability in which data received at any port may be switched to and transmitted by any port (either the same or other port of the switching element). Operationally, all data transfer from port to port within switching element 300 is accomplished via a bit-parallel time division multiplex (TDM) bus 302, which enables space switching which may be defined as the provision of a transmission path between any two ports within the switching element.

Each port 0 thru 15 of switching element 300 includes its own receive control logic $R \times 302$ and its own transmit control logic $T \times 306$ illustrated by way of example, for port number 7. Data is transferred to and from any port such as port 7 of the switching element 300 from switch-elements of like configuration with which switching element 300 is linked in bit-serial format via the receive control input line 308 and transmit control output line 310, respectively, at the 4.096 Mb/s system clock rate, with 512 serial bits constituting a frame, which is subdivided into thirty-two channels of 16-bits each.

Figure 9:
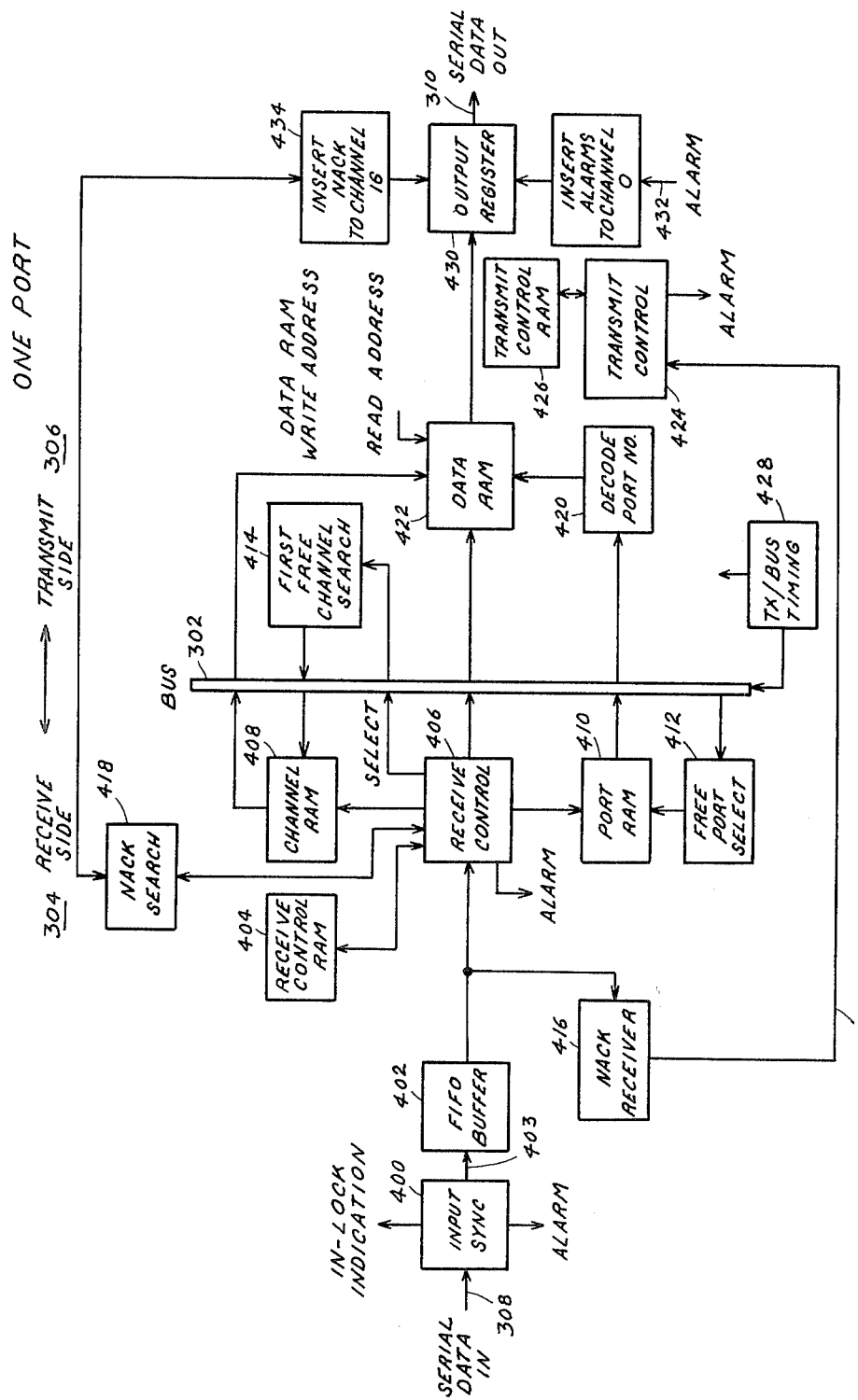
FIG. 9 is a block diagram of the logic of one port of the multiport switching element of the invention.

Data transmitted serially from the sixteen ports is both rate and phase synchronous, i.e., the transmit control logic 306 and the equivalent transmit control logic for the other 15 ports of the switching element 300 all transmit at the same 4.096 Mb/s clock rate, and at any instant are transmitting the same bit position of a frame. On the other hand, reception of bit serial data at the receive control logic 304 of port 7 and at all other ports of the switching element 300 is rate synchronous only, i.e., there is no necessary relationship with respect to which bit in a frame that any two ports may be receiving at any instant. Thus, reception is phase asynchronous. Receive control logic 304 and transmit control logic 306 each include a control logic portion and a random access memory, described with reference to FIG. 9.

Referring now to FIG. 4, one plane of group switch 10, such as plane 0, 100 is illustrated. As described with reference to FIG. 3, the switching elements such as 108, 110, 112, from which the group switch plane is constructed are 16-port single-sided switching elements 300. It is only by definition i.e., position in the switching network, that switch ports are designed as inlets or outlets. In the three stage group switch plane 100, an illustrative embodiments shows ports 0 thru 7 of switching elements 108 and 110 in stages 1 and 2 are designated as inlets and ports 8 thru 15 are designated as outlets, thus appearing as two-sided, wherein in stage 3, all switching elements such as switching elements 112 are single-sided, i.e., all ports are designed as inlets.

In general, considering any group switch stage, if at some time additional stages are necessary to modularly effect network growth, then the stage is equipped as a two sided stage with the outlets reserved for growth. However, if at any stage the size of the network allows greater than half the maximum required terminals to be connected, then the stage is equipped as a single-sided stage. This allows continual modular expansion up to the maximum required network size without requiring a rearrangement of the linking between stages.

Figure 5C:
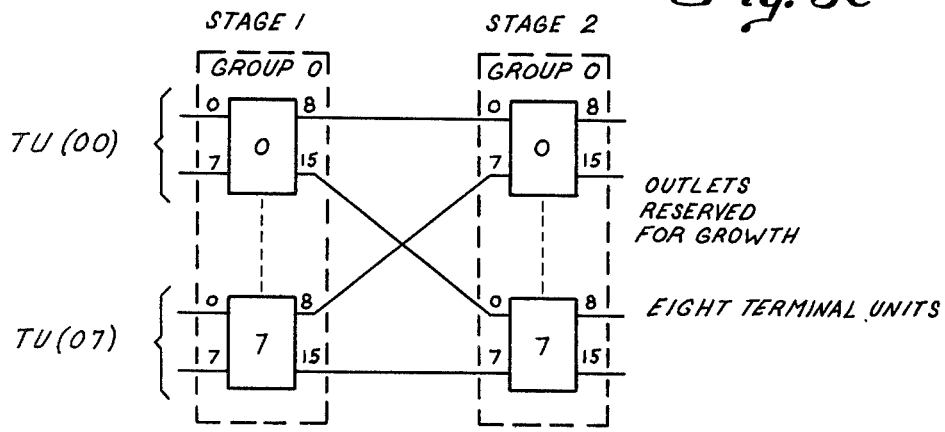

The modular expansion of the switching element 300 to a switching plane 100 is illustrated by FIGS. 5(a) thru 5(d). FIG. 5(a) illustrates the size of a group switch plane of a group switch 10 required for an application of one terminal unit having, for example, about 1000 subscriber lines. Thus, port 0 may be coupled to line 26 of terminal subunit 18 while ports 1 thru 7 are coupled to other access switches in terminal unit 12. Ports 8 thru 15 are reserved for network growth.

Referring to FIG. 5(b), an example of the next stage of growth and the group switch plane 100 is illustrated, for two terminal units, such as terminal units 12 and 14. Thus, two first stage switching elements are provided per plane of the group switch with each plane having second stage switching elements, for example 0, 1, 2 and 3 to interconnect the two first stage switching elements. The outlets on the second stage are reserved for subsequent network growth, and this network (one plane of which is illustrated) will service about 2000 subscriber lines.

Figure 5D:
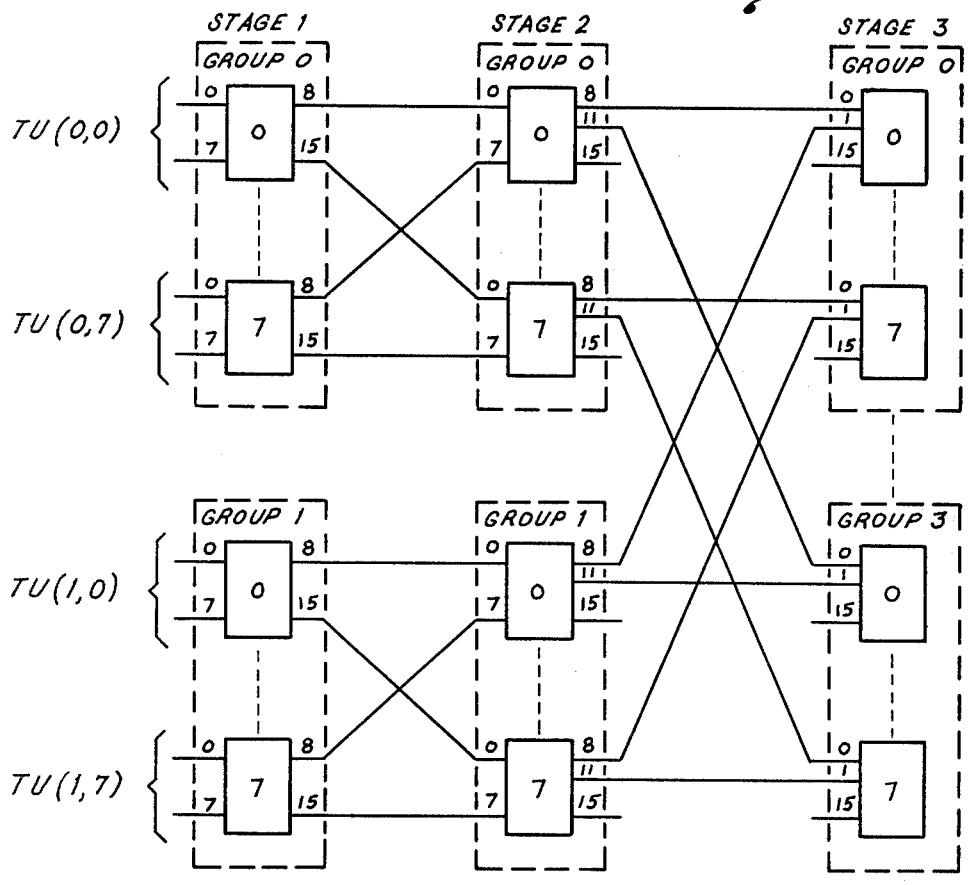

Referring now to FIG. 5(c), an example of the growth of a switching plane 100 to accomodate eight terminal units is illustrated. The stage 1 and stage 2 switching elements are now shown as fully interconnected and only the stage 2 outlets are available for further growth, hence to interconnect additional groups of up to eight terminal units, a third stage of switching per plane must be added, as illustrated by FIG. 5(d), which illustrates sixteen terminal units coupled to the expanded group switch plane. Typically, the switching capability of the network of FIG. 5(c) is about 10,000 subscriber lines and the switching capability of the network of FIG. 5(d) is about 20,000 subscriber lines. The unconnected ports as shown in FIG. 5(b), 5(c) and 5(d) are available for expansion, and each plane of the network, for example FIG. 5(d) is expanded by connection of these ports up to, for example, the network of FIG. 4, which has a capacity to switch in excess of 100,000 subscriber lines.

Figure 6:
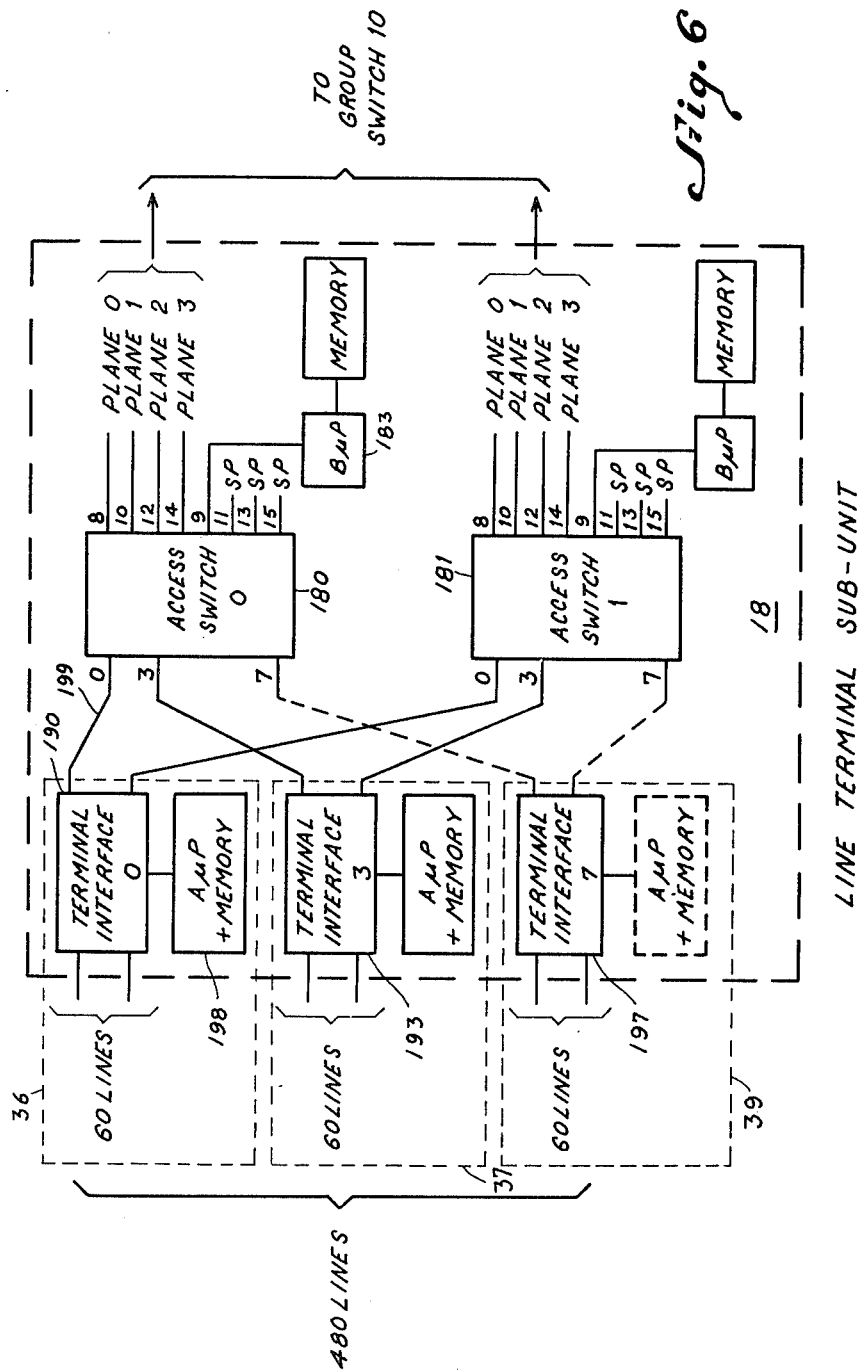
FIG. 6 is a block diagram of a line terminal subunit.

Referring now to FIG. 6, a line terminal subunit 18 is illustrated which includes up to eight terminal clusters 36, each of which terminal clusters include sixty subscriber lines, a terminal interface and an A-microprocessor, three of which terminal clusters are illustrated at 36, 37 and 39. The terminal subunit 18 access switches 180 and 181 serve eight terminal clusters, three of which are illustrated for simplicity of description. Each terminal interface, such as interface 190 is associated with for example, sixty subscriber lines from sixty line circuits, and an A-processor 198 which is dedicated to certain processing functions, such as path set-up through the switching network, or terminal control, for lines coupled to the terminal interface 190. Each terminal interface 190 has one bidirectional transmission link such as link 199 to a port of each of the access switches such as access switches 180 and 181. Each access switch such as access switch 180, which comprises the 16-port switching element described with reference to FIG. 3, provides switched access either to the planes of the group switch 10, for example, via outlet ports 8, 10, 12, 14 or to a B-processor 183 via for example an outlet such as outlet port 9, this B-processor performing other processing functions such as call control. Unused outlet ports of the access switch, such as ports 11, 13 and 15; are shown as SPARE and are available for equipping other devices such as alarms, monitors, diagnostics controllers, etc.

Figure 7:
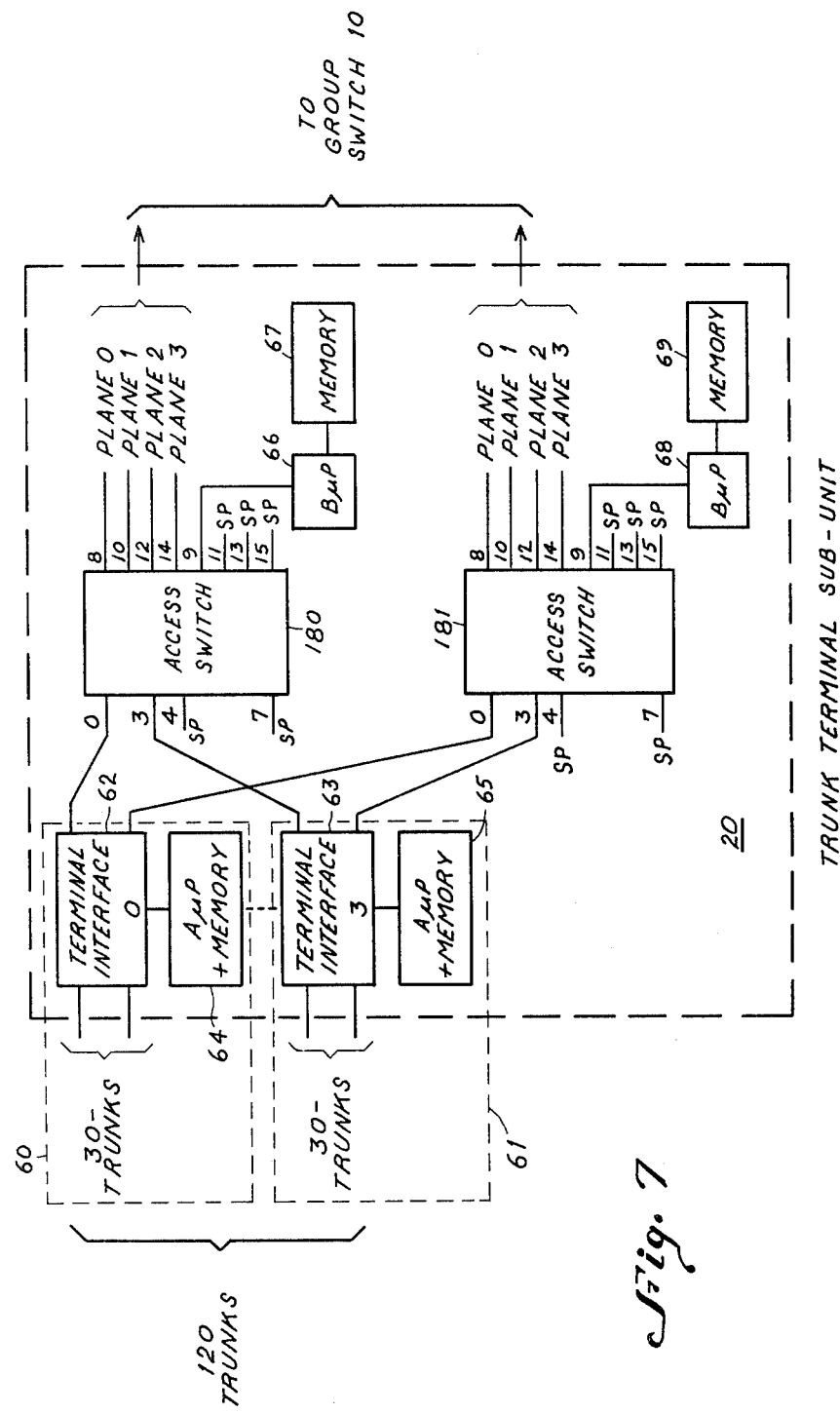
FIG. 7 is a block diagram of a trunk terminal subunit.

Referring now to FIG. 7, a trunk terminal subunit such as subunit 18 is shown which is functionally identical to the line terminal subunit described with reference to FIG. 6; however, which services a lesser number of high traffic inputs. To account for the increased traffic intensity of trunk groups compared with line terminals, the trunk terminal subunit comprises up to four terminal interfaces each of which is associated with, for example, thirty trunk terminals. Thus, inlets 4 through 7 on each access switch 180 and 181 are unused in this configuration. Thus, trunk terminal clusters 60 and 61 of four trunk terminal clusters are illustrated, each including a terminal interface 62 and 63 respectively and an A-processor and memory 64 and 65 respectively.

The B-processor and associated memory 66 and 67 coupled to access switch 180 and B-processor and associated memory 68 and 69 coupled to access switch 181 are of the same configuration as described with reference to FIG. 6, and may for example comprise Intel Corp. 8085 Model microprocessors.

Figure 8:
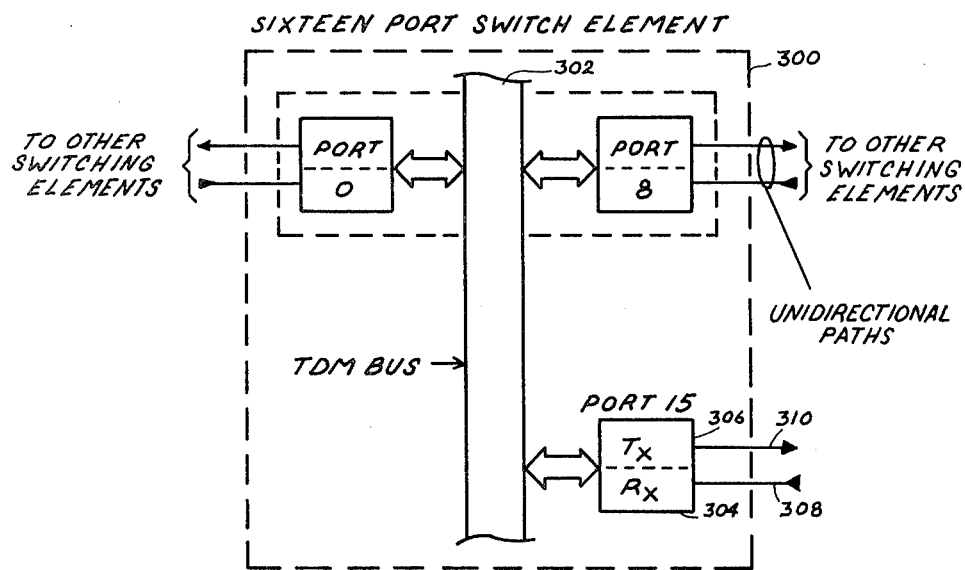
FIG. 8 is a simplified illustration of the TDM bus of the multiport switching element of the invention.

Referring now to FIG. 8, the sixteen port switching element 300 described with reference to FIG. 3 will be further described. Each port, such as port 15 of the switching element 300, consists of a receive control logic 304, a transmit control logic 306, input and output unidirectional transmission paths 308 and 310 respectively, and access to a parallel time division multiplexed bus 302 within switching element 300.

In a preferred embodiment of the invention, connections are set up through the switching element 300 on a unidirectional (simplex) basis. A simplex connection between an input channel of a port (one of 32 channels) to an output channel of any port (one of 512 channels) is established by an in-channel command referred to as a SELECT command. This SELECT command is contained in the single 16-bit word in the input channel requesting the connection. A number of different types of connections are possible through a switching element and these are differentiated by information in the SELECT command. Typical select commands are "any port, any channel"; which is a command that is received by the receive control logic of the port and initiates a connection to any free channel in any outlet of any port, "Port N, Any channel"; is another SELECT command which initiates a connection to any free channel in a particular port N, i.e., port 8 "Port N, Channel M"; is another SELECT command which initiates a connection to a specified channel M such as channel 5 in a specified port N, such as port 8. Other specialized SELECT commands such as "connect to one of any odd (or even) numbered ports" and specialized channel 16 commands and maintenance commands in channel O are included in the capacity of the switch module (one port thereof being comprised of one module), as described in greater detail with reference to FIG. 9.

The receive control logic 304 for each port synchronizes to the incoming data from other switching elements. The channel number (0–31) of the incoming channel is used to fetch destination port and channel addresses from port and channel address storage RAM's. During the multiplexed module access to bus 302 in the channel the receive logic 304 sends the received channel word along with its destination port and channel addresses to the TDM bus 302 of switching element 300. During every bus cycle (the time during which data is transferred from the receive control logic 304 to the transmit control logic 306), every transmit logic at every port looks for its port address on the TDM bus 302. If the port number on the bus 302 corresponds to the unique address of a particular port, the data (channel words) on the bus 302 is written into the data RAM of the recognizing port at an address corresponding to the address read out of the channel RAM to the receive control logic port. This accomplishes a one-word data transfer from a receive control logic through the TDM bus 302 to the transmit control logic of a port.

The port transmit and receive control logic for a typical port 300 operates as follows: Data at 4.096Mb/s on line 308 is coupled into input sync circuit 400, which provides bit and word synchronization to the information on line 308. The output of sync circuit 400 is a 16-bit channel word and its channel number (representing the channel position within the frame), is coupled to a first-in-first-out buffer register stack 402 which synchronizes data on line 403 to the bus 302 timing, which is required since data on line 308 is asynchronous to the bus 302 timing. The FIFO buffer 402 output is a 16-bit channel word and its 5-bit channel number. Information contained within the 16-bit channel word indicates the nature of the information contained by the word. This information is contained within protocol bits of the channel word and together with information in the receive control RAM 404 specifies the action to be taken by the receive control circuit 406 for this channel in this frame.

Five types of actions, SPATA, SELECT, INTERROGATE, ESCAPE or IDLE/CLEAR are possible. If the protocol is SPATA (speech and data words), the channel word is sent to bus 302 unmodified and the channel address fetches destination port and channel addresses from the channel RAM 408 and the port RAM 410 and couples them to the bus 302 during the port's receive logic bus access time slot. If a select command is "any port, any channel" the first free port select circuit 412 selects a transmit logic with an idle channel to do a "first free port select" into. During the receive logic TDM bus 302 access time a "first free channel select" is done into the selected port into the selected transmit logic which returns a "free channel" number from its first free channel search circuit 414. A NACK receive circuit 416 examines the contents of channel-16 for path set-up failure indications from succeeding stages of the switching network that have been set up through the transmit logic 306 of the module. NACK search logic 408 examines the receive control RAM 404 for channels that are NACK'ed (not acknowledged) and causes the channel numbers of NACK'ed channels to be outpulsed from the transmit logic 306 in channel-16.

Transmit logic 306 examines the state of the port address lines of the bus 302 with its module identification code at decode port logic. If the correct port address is decoded at decoder 420, and the select line of bus 302 is inactive, then the contents of the SPATA lines of the bus 302 will be written into data RAM 422 at an address given by the state of the channel address lines of the bus 302.

If the select line of bus 302 is active and a first free channel search is requested by receive control such as 406 (for any channel selection) then no data RAM 422 write operation occurs, but a free channel number is returned to the requesting receive logic such as 304 from the first free channel search circuit 414.

The data RAM 422 is a time slot interchanger and is read out of sequentially under the control of a counter contained in transmit/bus timing circuit 428. Words read out of data RAM 422 are loaded into a parallel-input-serial-output register 430 which couples the serial bit stream to transmit line 310 at 4.096 Mb/s. The word loaded into output register 430 may be modified in channel 0 or 6. In channel 0, alarms on line 432 are inserted (for error checking) and the NACK channel information is inserted in channel-16, when required, by logic 434. The transmit control RAM 426 contains the status of each outgoing channel. The transmit control logic 424 coordinates the read and write operations to the data RAM 422 and transmit control RAM 426, free channel search 414, and output register 430 loading.

The establishing of connections through the network between terminals will now be described.

As aforementioned, the 16-port switching elements provide both time and space switching functions for all transmission paths. Information arriving on the incoming path at any port for any channel can be transferred by the 16-port switching element to the outgoing path of any port, this giving space switching, and any channel on that path, this giving time switching. All speech and data (SPATA) transmission through the network is the result of individual ports in the multi-port switching elements implementing transformation of input channel (one out of 512) to output channel (one out of 512), as predetermined by path set-up procedures, with thirty-two channel words per frame on any given transmission path. FIG. 10 illustrates one exemplary channel word format which is applicable to all of channels 1 through 15 and 17 through 31, all of which channels are SPATA channels. The channel word formats for channel 0 (maintenance and synchronization) and channel 16 (special purpose control, NACK, etc.) are illustrated by FIG. 11.

The SPATA channels can be used for both digital speech and interprocessor data transmission. When speech is transmitted, 14-bits per channel word are available for the encoded PCM sample and 2-bits are available for network protocol selection. When used for path set up control, 13 bits/channel word are available for the data and 3-bits for protocol selection. The channel word format enables switching throughout the network, which involves connection through a plurality of the 16-port switching elements. These connections are unidirectional. For bidirectional connection, two unidirectional connections are required.

Referring now to FIG. 10, exemplary channel word formats are illustrated for all channels except channels 0 and 16. FIG. 11 illustrates exemplary channel word formats for channel 16. FIGS. 10(a) through 10(d) illustrate data field formats for SELECT, INTERROGATE, ESCAPE, SPATA and IDLE/CLEAR respectively. FIGS. 11(a) through 11(e) illustrate SELECT, ESCAPE, HOLD and IDLE/CLEAR for channel 16 and the alarm format for channel 0. The channel words in channel 0 also contain the frame synchronization bit pattern (6-bits) between adjoining 16-port switching elements.

SELECT command sets up a connection through a switching element.

INTERROGATE command is used after the path is set up to determine which port was chosen in the switching element for that path.

ESCAPE command is used once a path has been set up to transfer information between two terminal clusters and to distinguish such information from digitized speech samples.

SPATA format is used to transfer speech or data information between any two terminals.

IDLE/CLEAR command format indicates that the channel is clear.

For channel 16, the SELECT, ESCAPE and IDLE/CLEAR commands are similar to those described with reference to FIG. 10, except as there is no SPATA mode, the INTERROGATE command is not required and since channel 16 carries the NACK channel, the types of SELECTS are restricted. the HOLD command maintains a channel 16 connection once it has been set up by SELECT commands. Channel 0 is reserved for maintenance and diagnostics of the network.

Figure 12:
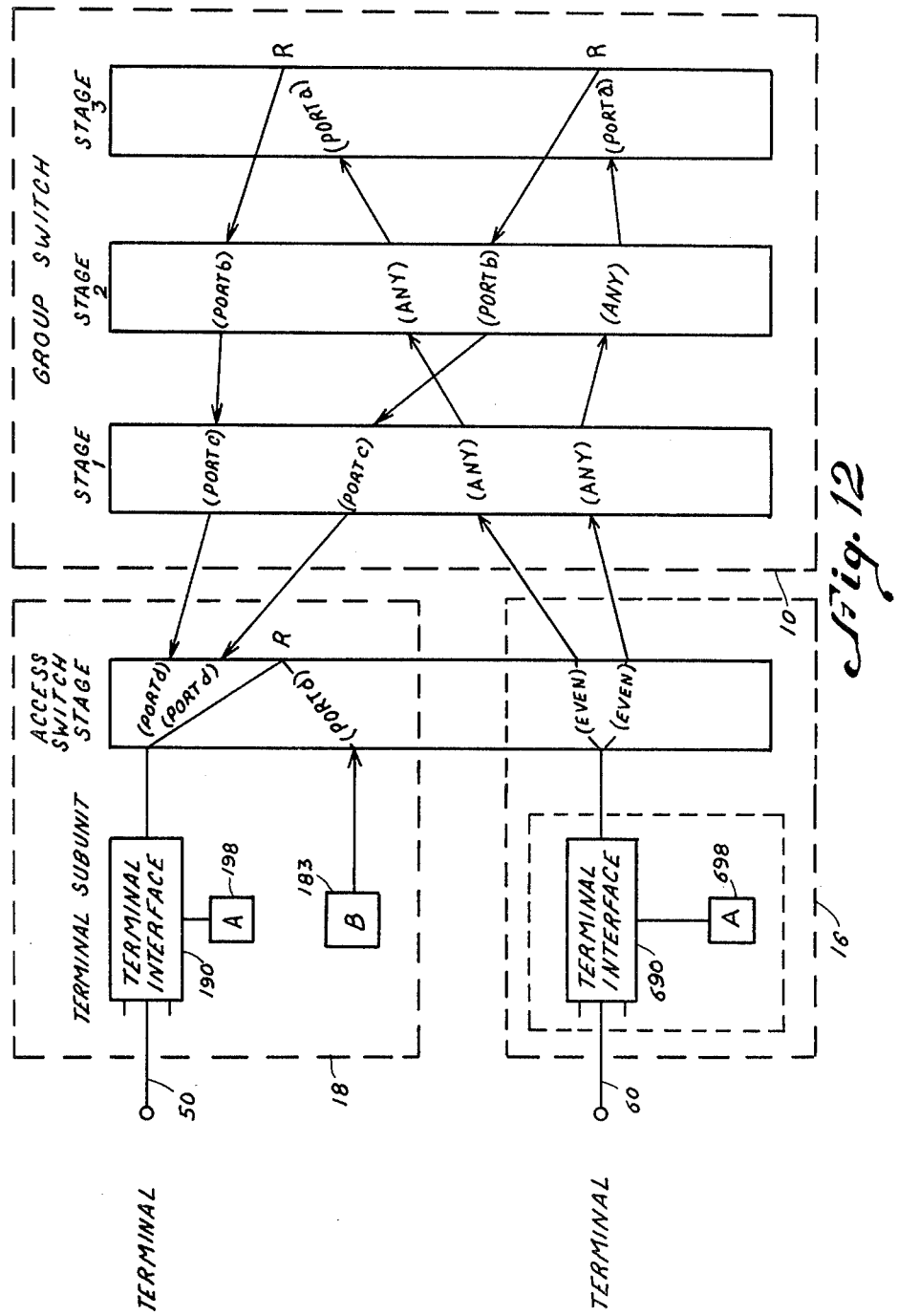
FIG. 12 illustrates a typical connection between terminals thru the switching network of the invention.

Referring now to FIG. 12, which illustrates a terminal subunit 18, which contains its portion of the access switching stage, access switches 42 and 44, as described with reference to FIG. 1, and the group switch 10, which contains three stages of switching. Individual planes in the group switch and individual switching elements within each stage are not shown, for simplicity of description.

A connection through the switching network is set up from one terminal interface, such as 690 to another terminal interface such as 190; or from a B-processor such as 183 to another process such as A-processor 198 associated with terminal interface 190 by a series of SELECT commands, i.e., channel word formats which are inserted into the PCM framed bit stream between the originating terminal interface (or processor) and the access switch in successive frames in the channel allocated to the connection. One SELECT command is required for each path connection through each stage of switching.

A connection through the switching network is made by a sequential series of connections through individual switching stages. The connection proceeds as an orderly progression from lower numbered stages to higher numbered stages by "inlet to outlet" connections across switching elements until a predetermined "reflection stage" is reached. Reflection is the connection between inlet ports in the switching element and enables connection to be made without penetrating the switching network more than is required to complete the desired connection. For a detailed description of the concept of reflection in a switching network, reference is made to copending application Ser. No. 909,583, a continuation of Ser. No. 766,396, filed Feb. 7, 1977.

Across the switching element in the reflection stage an "inlet to inlet" connection is made, followed by an orderly progression from higher numbered stages to lower numbered stages by "outlet to inlet" connections across switching elements.

The predetermination of the "reflection stage" is made with respect to a unique network address of the required terminal interface such as 190. These rules are generalized as follows:

If the terminating terminal interface is in the same terminal subunit, reflection is made to occur at the access switch.

If the terminating terminal interface is in the same terminal unit, reflection is made to occur at stage 1.

If the terminating terminal interface is in the same group of terminal units, reflection is made to occur at stage 2.

For all other cases, reflection is made to occur at stage 3.

Referring again to FIGS. 1 and 4, which illustrate a unique feature of the network architecture, a terminal unit, such as terminal unit 12, which has 8 bidirectional transmission links to each group switch plane such as the illustrated plane 0 of FIG. 4, these transmission links terminate on one switching element in each plane. This switching element can be seen to have a unique address when viewed from the center (i.e. third stage) of the group switch 10. Thus, for example, with reference to FIG. 4, the switching element 108 when viewed from any switching element in the third stage is accessible via inlet 0 from stage 3 followed by inlet 0 from stage 2. This constructs the address of the terminal unit, i.e., it is given the address TU (0,0). Furthermore, a terminal subunit is uniquely addressed within a terminal unit with respect to the second stage inlets, i.e., with reference to FIG. 1, terminal subunit 18 can be seen as TSU (0) of TU (0,0) as it is uniquely addressed from inlets 0 and 4 of first stage switch (0,0). Similarly, each terminal interface in each terminal cluster is uniquely addressed via its inlet address on the access switch. Thus, the address of a terminal interface, such as interface 190 of FIG. 12 as seen by any other terminal interface such as 690 in terminal unit 16, for example, is independent of which switching element in stage three is the "reflection point".

This allows the path set up controlling A-processor, 698, to launch the following sequence of SELECT commands into the network in order to set up a connection to the terminal interface 190 whose network address is, for example, (a,b,c,d).

FRAME 1. SELECT, ANY EVEN PORT, ANY CHANNEL:

This sets a SPATA connection through the access switch to a group switch plane.

FRAME 2. SELECT, ANY PORT, ANY CHANNEL:
This sets a connection through stage 1 of the chosen plane.
FRAME 3. SELECT, ANY PORT, ANY CHANNEL:
This sets a connection through stage 2 of the chosen plane.
FRAME 4. SELECT PORT (a) ANY CHANNEL:
This reflects the connection through stage 3 to stage 2.
FRAME 5. SELECT PORT (b) ANY CHANNEL:
This sets a connection back through stage 2.
FRAME 6. SELECT PORT (c) ANY CHANNEL:
This sets a connection back through stage 1.
FRAME 7. SELECT PORT (d) ANY CHANNEL:
This sets a connection back through the access switch to terminal interface (a,b,c,d).

This network permits switching forward to any reflection point in the stage determined as the reflection stage and then back through the network with a constant address which is independent of the reflection switching element in that stage.

The sequence of SELECT's can be used by any terminal interface to set up a connection to TI (a,b,c,d) and the "first free channel" selection mechanism described above ensures minimum transmission delay on the selected path. Where reflection is possible at an earlier switching stage as decided from the rules given above, a subset of the above sequence can be used. Thus, as shown in FIG. 12, the B-processor, 183, which is in the same terminal subunit 18 as is terminal interface 190, need launch only the following subset of the above sequence.

FRAME 1. SELECT PORT (d) ANY CHANNEL.

The processing functions performed by the A and B processors are dependent upon the particular computer programs utilized; however, exemplary processing functions are: terminal control, which provides the features for each class of service for subscriber or trunk lines; signalling control, which generates signals to call terminals under control of the terminal control processing, and decodes and interprets sequences of signals and digits which are coupled as telephone events to the terminal control processor for action; switching control, which sets up, maintains, and tears down paths thru the network as directed by the terminal control and signalling control functions; data base control, which performs all operation on the physical data base and allows all other processes to operate independenly of a particular organization the data base; and hardware control, which comprehends processes for the control of the hardware actually interfacing subscriber lines or trunks, and for the terminal units and switching elements. An exemplary distribution of processing functions is the allocation of hardware control for up to 60 line terminals or 30 trunk terminals at each A microprocessor and the other functions being performed by the B microprocessor for some other number of terminals. Of course, switch control could alternatively be performed by the A microprocessor.

Figures 13, 14:
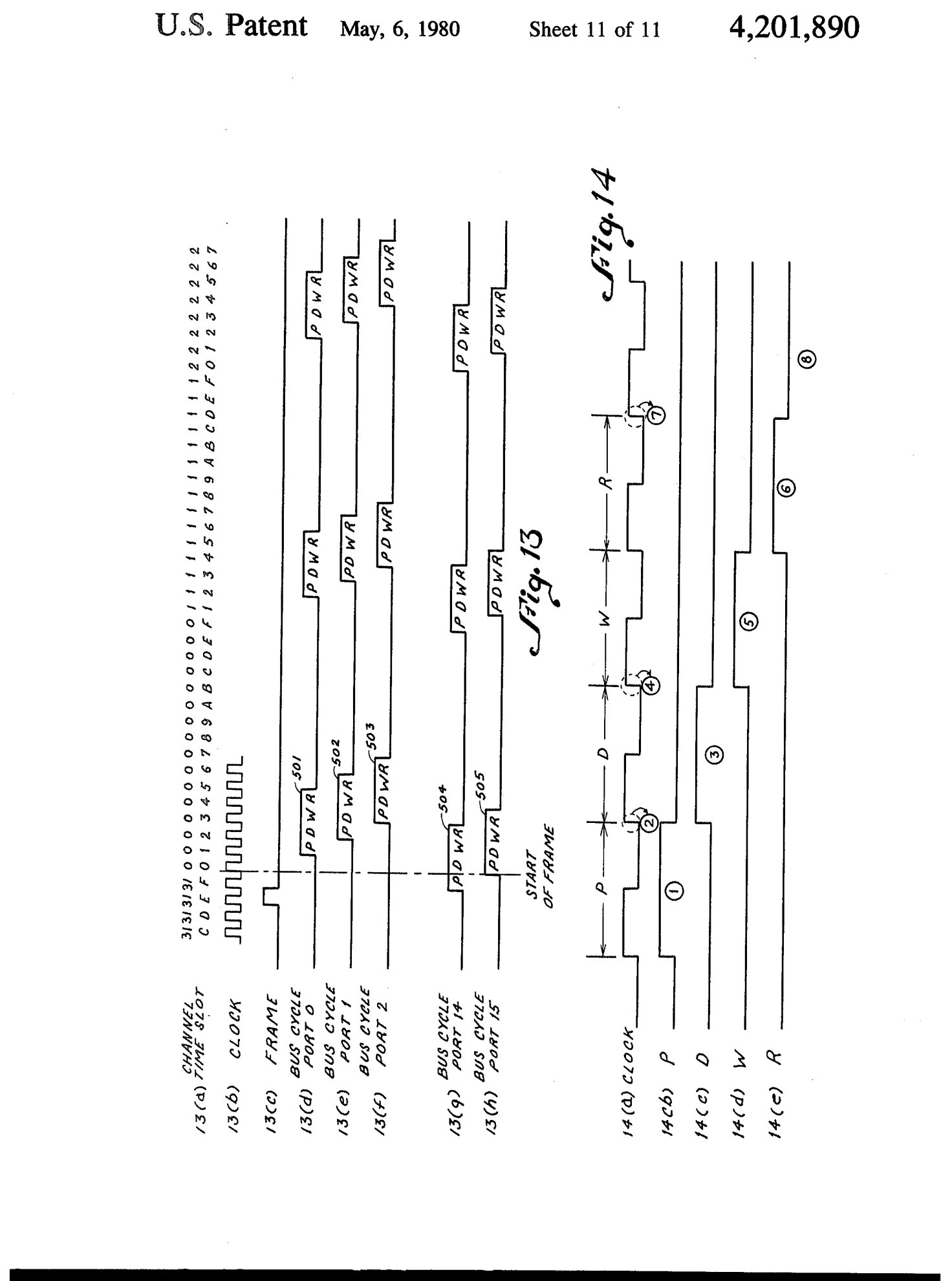

Referring now to FIG. 13, timing diagrams illustrative of the operative of a switching element 300 are shown.

FIG. 13(a) shows the current bus 302 time slot number and channel number, with 16 time slots constituting one channel; with the time slot numbers being written in hexidecimal notation, and with channels 0, 1 and eight time slots of channel two illustrated.

FIG. 13(b) is the 4.096 Mb/s bus clock.

FIG. 13(c) illustrates the frame synchronization which is a port synchronization command, which occurs on bus 302 during channel 31, time slot E.

FIGS. 13(d) thru 13(h) illustrate for ports 0, 1, 2, 14 and 15 of switching element 300 the time envelopes of the bus 302 transfer actions of their respective ports. Ports 3 thru 13 are not illustrated, but are operationally identical. Each of the bus transfer envelopes 501, 502, 503, 504 and 505 for ports 0, 1, 2, 14 and 15 respectively are time multiplexed. Each envelope includes four time slots P,D,W,R, during which specific actions occur on specific lines of the TDM bus 302 during specific times such that only one port is transmitting information on any one line of TDM bus 302 at any instant in time. The precise time of starting of any transfer envelope is determined by a unique port address code.

Referring now to FIG. 14, 14(a) shows the system clock illustrated by FIG. 13(b). FIGS. 14(b) thru 14(e) are expansions of the time slot P,D,W and R of typical bus transfer envelopes 501, 502, 503, 504 or 505.

Figure 15:
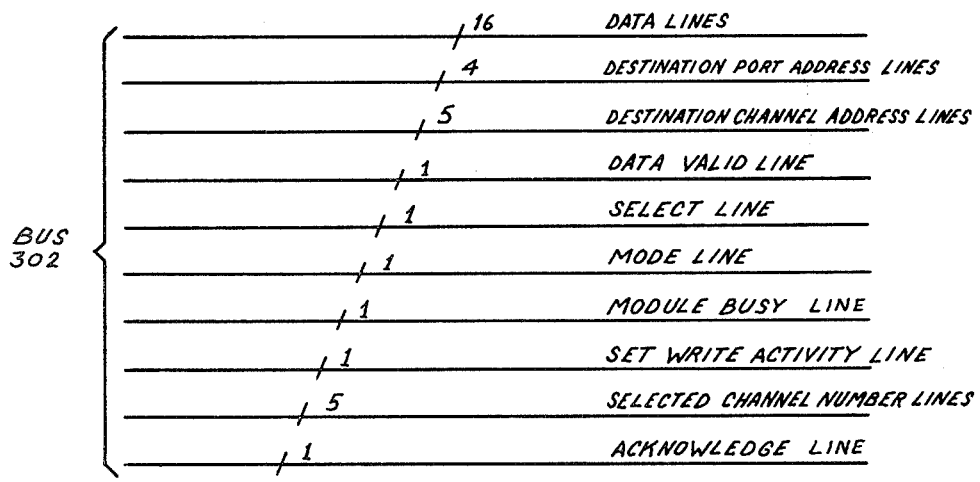
FIG. 15 illustrates the TDM bus lines of a switching element of the invention.

Bus 302 is comprised of thirty-six unidirectional lines for performing bus intercommunication functions between all sixteen ports, as illustrated by FIG. 15. The signals that the receive logic 304 of the module presents to the bus 302 are DATA (16-bits each on a separate line) DESTINATION PORT ADDRESS (4-bits each on a separate line), DESTINATION CHANNEL ADDRESS (5-bits each on a separate line), DATA VALID (1-bit), SELECT (1-bit), and MODE (1-bit). The signals that are received from the bus 302 are SELECTED CHANNEL (5-bits each on a separate line), ACKNOWLEDGE (1-bit), and MODULE BUSY (1-bit). Depending on the FIFO DATA word from the FIFO buffer 402 and the contents of the RECEIVE CONTROL RAM 404 addressed by the channel number output of FIFO 402 various signals are presented to the bus 302 and accepted from it, and various words written into the PORT, CHANNEL and RECEIVE CONTROL RAMS of the receive logic 304 for the enabled port. The SET WRITE ACTIVITY LINE of bus 302 is a special function line to override the occurrence of a predetermined function.

During time slot P shown on FIG. 14(b) as (1), the currently enabled receive logic 304 transmit to bus 302 the destination transmit logic port number and also puts appropriate signals on bus lines DATA VALID, SELECT, MODE and MODULE BUSY. On the rising edge of the clock shown on FIG. 14(a) as (2), all transmit logics 306 of all sixteen ports put the state of the above mentioned bus lines into registers associated with decode port number circuit 420 and transmit control 424. During time slot D, shown on FIG. 14(c) as (3), the receive logic of the enabled port puts information on the DATA LINES and DESTINATION CHANNEL ADDRESS LINES. On the next rising edge of the clock, shown on FIG. 14(a) as (4), this information is transferred into buffer registers associated with the data RAM 422. During time slot W, shown on FIG. 14(d) as (5), if the port number represented by the 4-bits on on the DESTINATION PORT ADDRESS LINES which occurred during time slot P matches the port identification code, of a particular port, which code is unique for each port, an operation occurs at the port's transmit logic. The operation may be a write into the data RAM 422 of that port or a response to a SELECT command. Also during time slot W, a proper value for the selected channel number is coupled from first free channel search circuit 414 onto the SELECTED CHANNEL NUMBER LINES, if appropriate, and a value (either logic 1 or 0) for an acknowledge signal is evaluated. A NACK is simply the lack of an acknowledgement signal. During time slot R, shown on FIG. 14(e) as (6), the destination port transmit logic places a response on the SELECTED CHANNEL number and acknowledges lines. The enabled receive logic transfers the state of these lines into a register associated with receive control 406 on the next CLOCK leading edge shown as (7) by FIG. 14(a), and some later time, shown as (8) by FIG. 14(e), updates its own port channel and receive control RAMs 410, 408 and 406 respectively.

NACK channel numbers received by a NACK receiver 416 at the receive logic of a particular port will cause a reject bit to be set in the transmit logic of the same port at the address specified by the received NACK channel number, i.e., a NACK in channel 16 may be decoded as "NACK channel 7" for example. The next time the receive logic which has set-up a path into channel 7 attempts to write into channel 7, it will get no acknowledge signal and will designate the channel with the path into channel 7 as being NACK'ed. The NACK search circuit 418 will then outpulse the number of the NACK'ed channel from its transmit logic, in channel 16.

Delay thru the network is automatically minimized by the use of the first free channel search technique. The first free channel search circuit 414 continuously looks at the "busy bit" of the transmit control RAM 424 for idle channels with the lowest channel number higher than the current output channel number coupled to the serial data on PCM line 310.

While the present invention has been described in connection with a preferred embodiment thereof, it is to be understood that additional embodiments, modifications, and applications which will become obvious to those skilled in the art are included within the spirit and scope of the invention as set forth by the claims appended hereto.

We claim:

1. A multiport switching element for providing and maintaining time and space switching for digitally encoded data received phase asynchronously in frames containing a plurality of channels of said data, said element coupling any of said channels at the input of the port receiving said channel to any channel at the output of any port in said element in response to digital command signals received by said port for said channel and in said channel, comprising:
    time division multiplexed common transmission bus means interconnecting said ports for providing a plurality of time slots, each time slot being dedicated to a particular channel of said frames coupled to the input of each port;
    means at each port responsive to said digital command signals for coupling said command signals and subsequent frames of data received in the channel in which said digital command signals are received to said common transmission bus means in the time slot dedicated to said channel; and
    means at each port selectively responsive to said digital command signals coupled to said common transmission bus means for extracting said frames of data from said common transmission bus means in the time slot dedicated to said input channel of said frames and for inserting said frames of data into the output channel designated by said digital command signals.

2. A multiport switching element in accordance with claim 1 wherein said means responsive to said command signals includes control logic means responsive to said command signals for selecting ports such that said switching element is operable as either a single-sided switching element or as a multisided switching element within a switching network.

3. A multiport switching element in accordance with claim 2 wherein said digital command signals comprise in-channel multibit data words addressing a particular port.

4. A multiport switching element in accordance with claim 2 wherein said digital command signals comprise in-channel multibit data words for sequentially addressing the ports of said switching element until an available channel at any addressed port is located.

5. A multiport single-sided switching element in accordance with claim 2 wherein said control logic means includes means responsive to said digital command signals for initiating a connection from any port via said common transmission bus to any free channel of any port addressed by said command signals.

6. A multiport switching element in accordance with claim 2 wherein said control logic means further includes:
    means for coupling data either into or out of said port in response to said command signals, and in the same channel as said command signals including receive control logic for providing bit and word synchronization for said data; and
    transmit control logic for bit-synchronously transmitting said data from said common transmission bus means bit serially out of said port.

7. A multiport switching element for providing space and time switching between any ports thereof in response to digital command signals for frames of digitally encoded data in a plurality of channels received bit asynchronously by said switching element, comprising:
    time division multiplexed common transmission bus means interconnecting said ports;
    means at each port responsive to said command signals in said channels for coupling said data in said channels bit-synchronously from any of said ports to said common transmission bus; and
    means at each port selectively responsive to said command signals for extracting said data from said transmission bus in the bus cycle for said channel and for serially transmitting said extracted data bit-synchronously in the output channel designated by said digital command signals from said port.

8. A multiport switching element in accordance with claim 7 wherein said digitally encoded data comprises PCM encoded speech samples time multiplexed in said channels.

9. A multiport switching element for providing and maintaining time and space switching between any inlet port thereof and any outlet port thereof in response to in-channel digital command signals for frames of digitally encoded data in a plurality of channels bit asynchronously coupled to said switching element comprising:
    inlet port means for receiving and interpreting command signals in any of said channels, and for receiving data in any of said channels, subsequently to receiving said command signals in the same channel;

time division multiplex common transmission bus means intercoupling said ports for providing a plurality of bus cycles, each dedicated to a particular channel;

means for coupling said command signals from said inlet port bit-synchronously to said common transmission bus means and for coupling said data to said common transmission bus means in the same channels as said command signals; and outlet port means addressed by said digital command signals for coupling said data out of said port in any output channel designated by said command signals such that space switching is provided between said inlet port and said outlet port by said common transmission bus means and time switching is provided by the outlet port means.

10. A multiport switching element in accordance with claim 9 wherein said data coupled to said inlet port means and coupled from said outlet port means is rate synchronous.

11. A multiport switching element in accordance with claim 10 wherein said multiport switching element includes sixteen ports, each of said ports being intercoupled to each other by said time division multiplex common transmission bus means.

12. A multiport switching element in accordance with claim 11 wherein said time division multiplex common transmission bus means provides a 16-port space switch in a single frame time and wherein said outlet port provides a multiple channel time switch.

13. A multiport switching element in accordance with claim 10 wherein said digitally encoded data is PCM encoded speech samples time multiplexed in said channels.

14. A multiport switching element in accordance with claim 13 wherein said PCM encoded speech samples are n-bit linear data bytes.

15. A multiport switching element in accordance with claim 10 wherein said digitally encoded data comprises multibit companded PCM samples.

16. A multiport switching element in accordance with claim 10 wherein said digitally encoded data comprises multiplexed data bytes.

17. A method for establishing and maintaining time and space switching in a multiport switching element for digitally encoded data received phase asynchronously in frames containing a plurality of channels of data by coupling any of said channels received at the input of the port receiving said channel to any channel at the output of any port in said element in response to and designated by in-channel digital command signals received by said port for said channel and in said channel comprising the steps of:

intercoupling said ports to a time division multiplexed common transmission bus such that a plurality of time slots each dedicated to a particular channel of said frames coupled to the input of each port are established;

selectively coupling said frames of data at each port receiving said data in response to said digital command signals in the same channel as said data and preceding said data to said bus in the time slot dedicated to said channel such that said data is coupled phase synchronously to said bus;

extracting said frames of data from said bus at each port selectively in response to said digital command signals and in the channels designated by said digital command signals; and phase synchronously coupling said extracted data from the output of said port and in the channels designated by said digital command signals.

18. A method in accordance with claim 17 further including the step of:

selecting ports as inlets or outlets such that said switching element is operable as either a single-sided or a multisided switching element within a switching network.

* * * * *